US008786151B1

(12) United States Patent
Cole et al.

(10) Patent No.: US 8,786,151 B1
(45) Date of Patent: Jul. 22, 2014

(54) APPARATUS FOR MAINTAINING AIR-GAP SPACING IN LARGE DIAMETER, LOW-SPEED MOTORS AND GENERATORS

(75) Inventors: Trevor H. Cole, Duxbury, VT (US); Garrett L. Bywaters, Waitsfield, VT (US); Adam R. Olsen, East Corinth, VT (US); Daniel Costin, Montpelier, VT (US)

(73) Assignee: Northern Power Systems, Inc., Barre, VT (US)

( * ) Notice: Subject to any disclaimer, the term of this patent is extended or adjusted under 35 U.S.C. 154(b) by 152 days.

(21) Appl. No.: 13/324,088

(22) Filed: Dec. 13, 2011

Related U.S. Application Data

(60) Provisional application No. 61/422,486, filed on Dec. 13, 2010.

(51) Int. Cl.
*H02K 5/16* (2006.01)
*H02K 49/00* (2006.01)

(52) U.S. Cl.
USPC .............................. 310/90; 310/92

(58) Field of Classification Search
CPC .................................................... H02K 21/025
USPC ................... 310/90, 76, 77, 93, 123; 384/102
IPC ...................................................... H02K 5/167
See application file for complete search history.

(56) References Cited

U.S. PATENT DOCUMENTS

| 5,021,697 | A * | 6/1991 | Kralick ........................ 310/90.5 |
| 6,326,710 | B1 * | 12/2001 | Guenther et al. ............... 310/77 |
| 7,122,923 | B2 * | 10/2006 | Lafontaine et al. ............. 310/58 |
| 7,180,204 | B2 | 2/2007 | Grant et al. |
| 7,528,497 | B2 | 5/2009 | Bertolotti |
| 7,709,971 | B2 | 5/2010 | Sane et al. |
| 2006/0152014 | A1 | 7/2006 | Grant et al. |
| 2007/0102934 | A1 | 5/2007 | Pescarmona et al. |
| 2008/0012346 | A1 | 1/2008 | Bertolotti |
| 2008/0050235 | A1 | 2/2008 | Wobben |
| 2009/0045634 | A1 | 2/2009 | Sane et al. |
| 2009/0174277 | A1 | 7/2009 | Mueller et al. |
| 2009/0206684 | A1 | 8/2009 | Jajtic et al. |
| 2010/0045047 | A1 * | 2/2010 | Stiesdal ......................... 290/55 |
| 2010/0072835 | A1 | 3/2010 | Klatt |
| 2011/0085752 | A1 * | 4/2011 | Tecza et al. ................... 384/295 |

FOREIGN PATENT DOCUMENTS

| EP | 1657437 A1 | 5/2006 |
| EP | 1783363 A1 | 5/2007 |
| EP | 2143944 A1 | 1/2010 |
| EP | 2157314 A1 | 2/2010 |
| EP | 2333933 A1 | 6/2011 |
| EP | 2333934 A1 | 6/2011 |
| WO | 0106623 A1 | 1/2001 |

(Continued)

*Primary Examiner* — John K Kim
*Assistant Examiner* — Thomas Truong
(74) *Attorney, Agent, or Firm* — Downs Rachlin Martin PLLC

(57) ABSTRACT

A rotor-stator structure including plural bumper elements that may employ synthetic sliding bearing surfaces, mounted to the stator, and designed to contact a machined surface on the rotor if generator structural deflection occurs during operation. During normal operation, the bearing surface is not in contact with the machine rotor. If extreme loads are imposed on the rotor or stator structures, or other issue like bearing failure, causes the air gap to close, the bumper elements will "touch down" on a machined surface on the rotor to maintain a minimum air gap.

3 Claims, 4 Drawing Sheets

(56) References Cited

FOREIGN PATENT DOCUMENTS

| WO | 2005019642 | A1 | 3/2005 |
|---|---|---|---|
| WO | 2007008884 | A1 | 1/2007 |
| WO | 2007104976 | A1 | 9/2007 |
| WO | 2007113498 | A2 | 10/2007 |
| WO | 2008076147 | A2 | 6/2008 |
| WO | 2008120257 | A2 | 10/2008 |
| WO | 2009105011 | A1 | 8/2009 |
| WO | 2009122428 | A2 | 10/2009 |
| WO | 2009156712 | A2 | 12/2009 |
| WO | 2010003868 | A2 | 1/2010 |
| WO | 2010081568 | A2 | 7/2010 |

* cited by examiner

APPARATUS FOR MAINTAINING AIR-GAP SPACING IN LARGE DIAMETER, LOW-SPEED MOTORS AND GENERATORS

RELATED APPLICATION DATA

This application claims the benefit of priority of U.S. Provisional Patent Application Ser. No. 61/422,486, filed Dec. 13, 2010, and titled "Apparatus for Maintaining Air-Gap Spacing in Large Diameter, Low-Speed Motors and Generators," which is incorporated by reference herein in its entirety.

FIELD OF THE INVENTION

The present invention generally relates to the field of wind power units. In particular, the present invention is directed to an apparatus for maintaining the air gap in large diameter, low speed motors or generators and similar electromechanical machines.

SUMMARY OF THE DISCLOSURE

Embodiments of the present invention comprise a rotor-stator structure including plural bumper elements that may employ synthetic sliding bearing surfaces, mounted to the stator, and designed to contact a machined surface on the rotor if generator structural deflection occurs during operation. During normal operation, the bearing surface is not in contact with the machine rotor. If extreme loads imposed on the rotor or stator structures, or other issue like bearing failure, causes the air gap to close, the bumper elements will "touch down" on a machined surface on the rotor to maintain a minimum air gap. In one exemplary embodiment, the machined surface on the rotor may be the rotor brake disc.

BACKGROUND

Maintaining a consistent air gap between the rotor and stator in electromechanical machines such as permanent magnet motors and generators is a critical aspect of efficient operation. On small diameter conventional motors and generators it is not difficult to design a machine structure that can maintain air gap clearance using conventional design methods. Maintaining a consistent air gap becomes more difficult for high torque, low speed machine designs, such as for the design of direct drive, gearless wind turbines, where the generator rotational speed is dictated by the wind turbine aerodynamic rotor. As one illustrative example, in a multi-MW class wind turbine the generator for a direct drive configuration may be required to produce its rated output power and torque at speeds in a general range of 14-16 rpm. A generator or motor in this general power and speed range must have a large air gap diameter, typically in the range of 3-5 meters. At these sizes under the experienced loads for such turbines, it becomes a design challenge to build a generator structure stiff enough to maintain the air gap integrity under all load conditions while maintaining the weight of the structural elements at a reasonable level.

Attempts have been made to add various bearing structures in order to address this problem. However, such proposed solutions generally involve relatively conventional bearing structures located at or close to the air gap to stabilize the air gap. But these conventional bearing-type solutions involve continuous load bearing structures with continuous contact that increase the weight and complexity of the design and add an additional maintenance item to the turbine design. As such, conventional solutions to this problem to date have been less than satisfactory.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Embodiments of the present invention provide an apparatus for a rotating device with an air gap between rotating and stationary structures that needs to be maintained at all times, with no possible load case or scenario where the air gap entirely closes and impact or interference occurs between the rotating and stationary parts. In order to maintain a consistent air gap between the rotating and stationary components, exemplary embodiments of the present invention utilize bumper elements that are non-contact in normal operation and only pick up contact as sliding elements in the event of excessive generator structure deflection in cases of extreme loads or when problems in the main bearings cause a change in the air gap. Such bumper elements can be conveniently disposed to contact existing wear structures such as a rotor brake disc thus avoiding the need to provide additional, high strength or reinforced bearing surfaces.

Figure 1:
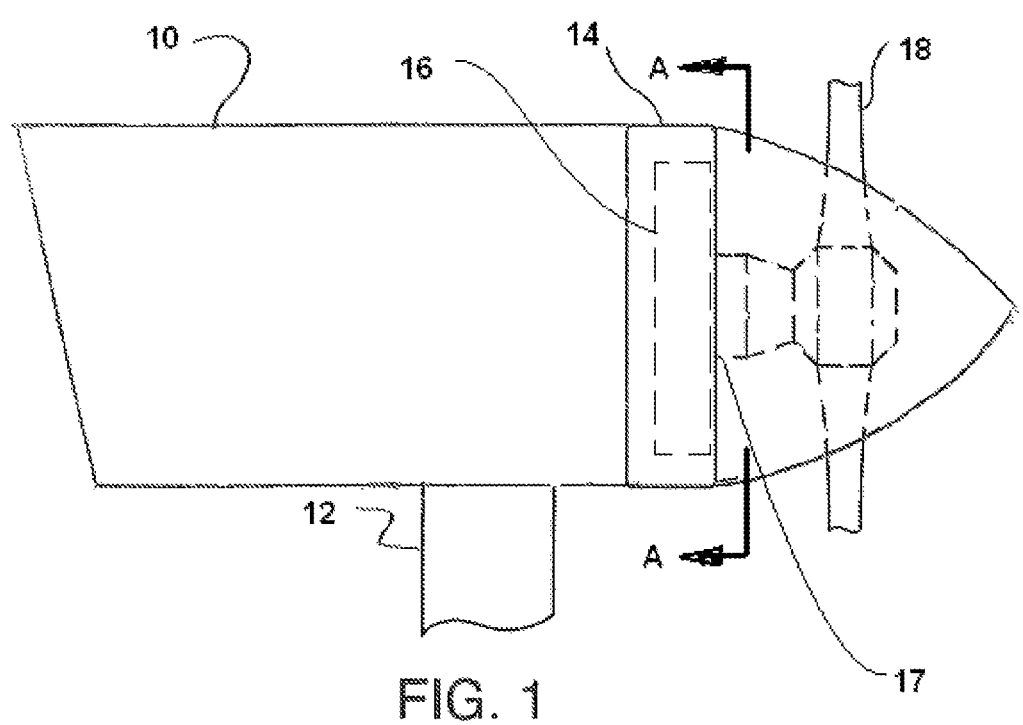
FIG. 1 is a schematic elevation view of a wind power unit according to an exemplary embodiment of the present invention.

FIG. 1 illustrates main structural components of an exemplary embodiment of the present invention as applied to a wind power unit. In this exemplary embodiment, wind power unit 10 is conventionally mounted on tower 12. The wind power unit includes a generator comprising a stator 14 and rotor 16 mounted on a centrally located main bearing 17 and driven by turbine blades 18. While not specifically illustrated in FIG. 1, persons of ordinary skill in the art will understand the location of the air gap between stator 14 and rotor 16.

Figure 2:
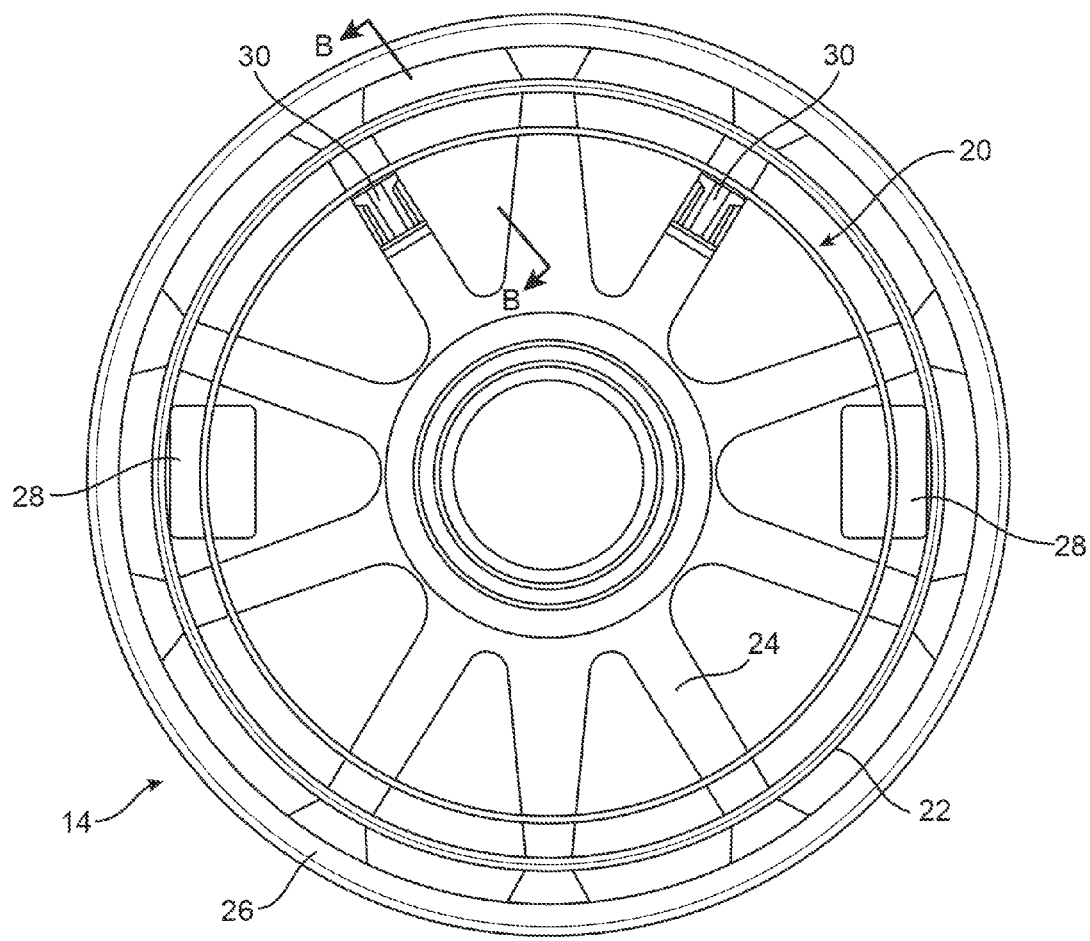
FIG. 2 is a partial section view of the stator and rotor of FIG. 1 as viewed at line A-A, illustrating the location of the brake disk and air gap bumpers according to an exemplary embodiment of the present invention.
Figure 3:
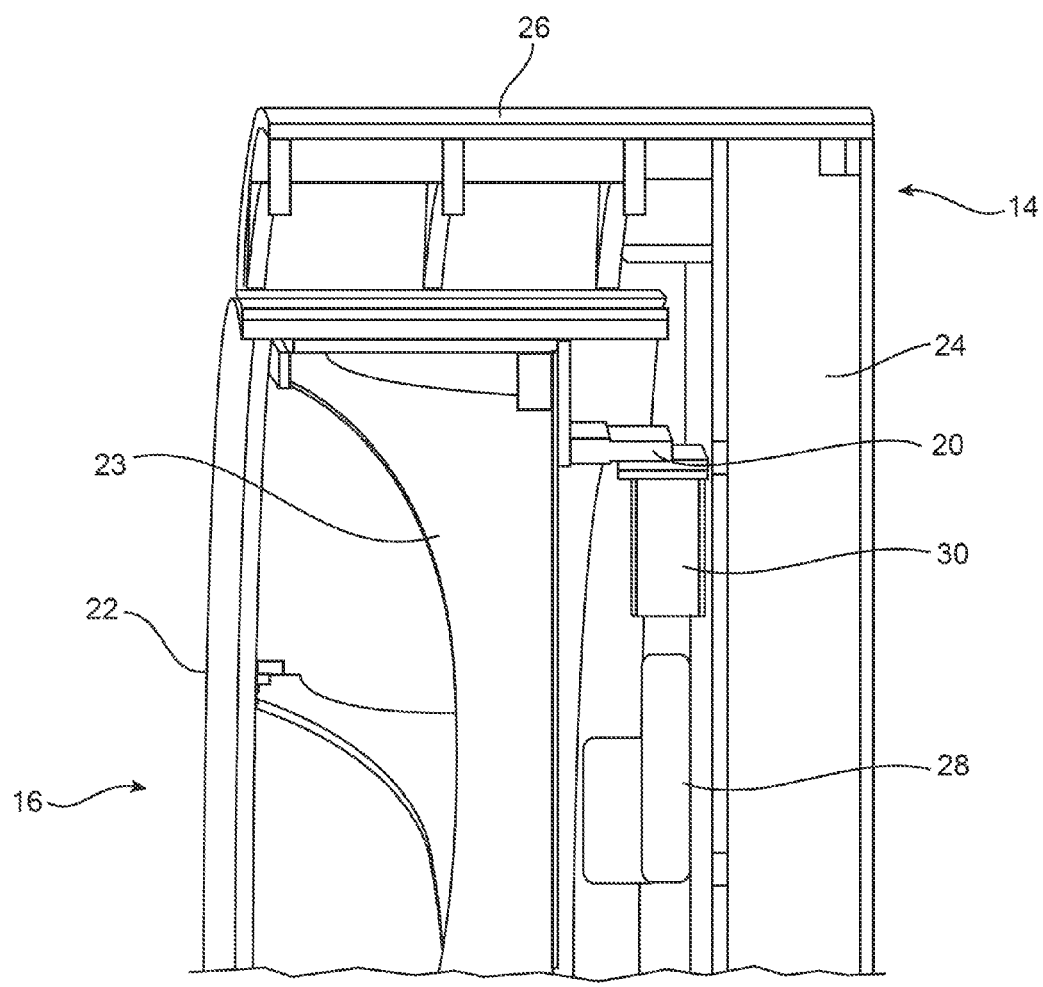
FIG. 3 is another partial section view of the stator and rotor as viewed at line B-B in FIG. 2.

Turning to the partial section views of FIGS. 2 and 3, rotor brake disc 20 and magnet support ring 22, supported by rotor webs 23, are shown in relationship to various components of stator 14. The rotor brake disc 20 and magnet support ring 22 are part of the overall structure of rotor 16, most of which is not shown in FIG. 2, so as not to obscure components of the stator.

Stator 14 includes structural members such as spokes 24 that support the outer annular core support structure 26. Rotor brakes 28 are mounted on the stator structure to cooperate with rotor brake disc 20 for use as a rotor brake under necessary circumstances as are understood by persons skilled in the art. Also mounted on the stator structure are bumper elements 30 according to one exemplary embodiment of the present invention.

Bumper elements 30 are spaced from the rotor brake disc 20 by an amount calculated to control rotor deflection and thus air gap distance so as not to exceed predetermined amounts under extreme and eccentric loading conditions. Persons of ordinary skill in the art will be able to determine the appropriate spacing between bumper elements 30 and disc 20 for specific rotor and stator design parameters and operating conditions based on the teachings contained herein. Bumper elements 30 thus serve as secondary bearings that come into play only under extreme load and deflection cases during operation, thus acting as a safety system to back up the main bearing and structural arrangement in cases of high load and deflection at the air gap. By using such bumper elements with a slow speed motor or generator, the basic structural elements of the machine can be made lighter and more flexible while still maintaining a minimum air gap.

Figure 4:
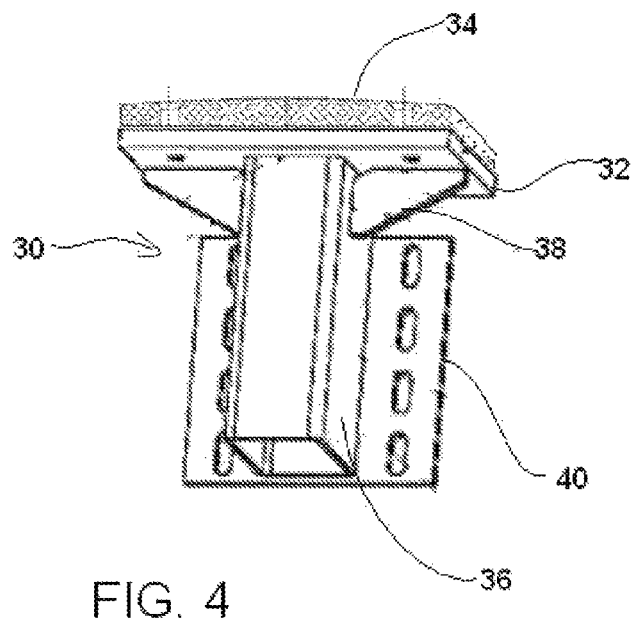
FIG. 4 is a perspective view of an air gap bumper according to an exemplary embodiment of the present invention.

One exemplary embodiment of bumper elements 30 is illustrated in FIG. 4. As shown therein, bumper elements 30 may include support plate 32 on to which a bumper pad 34 is secured by machine screws or other suitable means. In this embodiment, support plate 32 is mounted on a structural tube member 36 and includes web elements 38 to provide rigidity. A mounting structure such as mounting plate 40 may be used to facilitate mounting of bumper elements 30 on to the stator structure, for example by using bolts or screws. Bumper pad 34 may be made of plastic, polymer, or other composite material to present a suitable sliding bearing surface opposite the brake disc 20. Other members of bumper elements 32 may be fabricated from steel and joined, for example by welding. The material of the bumper pad also may be a synthetic material with a coefficient of friction lower than that of the material of the support structure.

Figure 5:
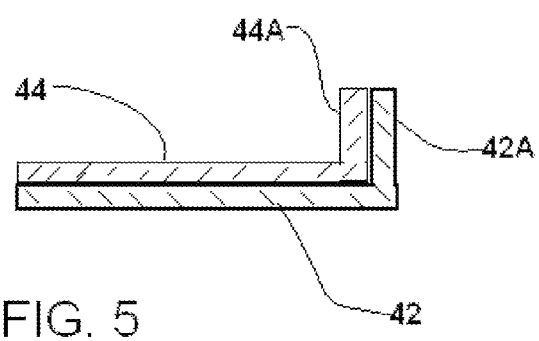
FIG. 5 is a side section view of a bumper pad and support plate according to an alternative exemplary embodiment of the present invention.

In the exemplary embodiment described above, bumper elements 32 help maintain the air gap by providing a radially-oriented sliding bearing surface. In other embodiments it may be desirable to further provide an axially-oriented sliding bearing surface. FIG. 5 illustrates an alternative support plate 42 and bumper pad 44, which include vertically extending members 42A and 44A. The vertically extending members may be positioned to contact the edge of rotor disc 20 or other appropriate machined rotor surface under extreme load conditions as described above and thus provide control and excessive deflection limitation in two directions.

As will be appreciated by persons of ordinary skill in the art, the components of exemplary embodiments described herein may be fabricated by conventional means and from conventional materials. For example, parts can be machined fabrications or castings; could be manufactured by a variety of qualified vendors. Bearing material can be a variety of materials, and can be machined or extruded to shape. Embodiments of the present invention thus allow the use of a lighter stator structure while still safely maintaining the machine air gap under all operating conditions without requiring any special fabrication or construction needs.

In the exemplary embodiments described above, the bumper elements utilize the existing safety brake disc surface designed into the rotor structure, thus dual purposing this generator design feature. However, persons of ordinary skill in the art will appreciate that other annular machined rotor surfaces including specially provided surfaces may be used as an alternative to the brake disc. The present invention has also been illustrated above by reference to exemplary embodiments wherein the rotor is positioned inside of the stator. Persons of ordinary skill in the art will appreciate based on the teachings herein that embodiments of the present invention are also equally applicable to electromechanical machine configurations where the stator is positioned on the inside with stator poles facing out and surrounded by the rotor.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for maintaining an air gap between a rotor and stator in an electromechanical machine, comprising:
   a. at least one bumper element mounted on one of the rotor or stator, wherein said bumper elements comprise a support structure with a pad mounted thereon; and
   b. a guide mounted on the other of the rotor or stator to provide for relative rotation between the at least one bumper element and guide surface when the rotor and stator rotate with respect to each other;
   c. wherein the bumper element and guide are positioned with respect to one another such that a predetermined distance is maintained therebetween and contact of the bumper element with the guide occurs only when deflection of the rotor or stator creates such contact, the bumper element and guide surface being configured and dimensioned to restrain such deflection, and
   d. wherein the guide comprises a rotor brake disk.

2. An apparatus for maintaining an air gap between a rotor and stator in an electromechanical machine, comprising:
   a. at least one bumper element mounted on one of the rotor or stator, wherein said bumper elements comprise a support structure with a pad mounted thereon; and
   b. a guide mounted on the other of the rotor or stator to provide for relative rotation between the at least one bumper element and guide surface when the rotor and stator rotate with respect to each other;
   c. wherein the bumper element and guide are positioned with respect to one another such that a predetermined distance is maintained therebetween and contact of the bumper element with the guide occurs only when deflection of the rotor or stator creates such contact, the bumper element and guide surface being configured and dimensioned to restrain such deflection,
   d. the pad comprises a material presenting a sliding bearing surface opposing said guide; and
   e. wherein the material presenting a sliding bearing surface comprises a synthetic material with a coefficient of friction lower than that of a material of the support structure.

3. An apparatus for maintaining an air gap between a rotor and stator in an electromechanical machine, comprising:
   a. at least one bumper element mounted on one of the rotor or stator comprising a support structure including a support plate with a pad mounted thereon, the pad presenting a sliding bearing surface wherein the sliding bearing surface comprises a synthetic material with a coefficient of friction lower than that of a material of the support structure; and
   b. a guide mounted on the other of the rotor or stator to provide for relative rotation between the at least one bumper element and guide surface when the rotor and stator rotate with respect to each other;
   c. wherein the bumper element and guide are positioned with respect to one another such that a predetermined distance is maintained therebetween and contact of the bumper element with the guide occurs only when deflection of the rotor or stator creates such contact, the bumper element and guide surface being configured and dimensioned to restrain such deflection.

* * * * *